US008850479B2

(12) United States Patent
Liao et al.

(10) Patent No.: US 8,850,479 B2
(45) Date of Patent: Sep. 30, 2014

(54) DISTRIBUTION DEVICE AND RECEPTION DEVICE

(75) Inventors: Xuan Liao, Singapore (SG); Ming Ji, Singapore (SG); Sheng Mei Shen, Singapore (SG); Junichi Sato, Tokyo (JP); Ichiro Takei, Tokyo (JP); Wataru Fujikawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1011 days.

(21) Appl. No.: 11/817,559

(22) PCT Filed: Mar. 1, 2006

(86) PCT No.: PCT/JP2006/303893
§ 371 (c)(1), (2), (4) Date: Nov. 13, 2007

(87) PCT Pub. No.: WO2006/093197
PCT Pub. Date: Sep. 8, 2006

(65) Prior Publication Data
US 2009/0013351 A1    Jan. 8, 2009

(30) Foreign Application Priority Data
Mar. 2, 2005   (JP) ................................. 2005-058116

(51) Int. Cl.
*H04N 5/445* (2011.01)
(Continued)

(52) U.S. Cl.
CPC ........... *H04N 7/17318* (2013.01); *H04N 21/84* (2013.01); *H04N 21/8549* (2013.01);

(58) Field of Classification Search
None
See application file for complete search history.

(56) References Cited

U.S. PATENT DOCUMENTS

| 6,536,041 | B1 | 3/2003 | Knudson et al. |
| 7,631,330 | B1 * | 12/2009 | Des Jardins ............... 725/44 |

(Continued)

FOREIGN PATENT DOCUMENTS

| EP | 1786126 | 5/2007 |
| JP | 10303984 | 11/1998 |

(Continued)

OTHER PUBLICATIONS

English language Abstract of JP 10-303984.

(Continued)

*Primary Examiner* — Nasser Goodarzi
*Assistant Examiner* — Fred Peng
(74) *Attorney, Agent, or Firm* — Greenblum & Bernstein, P.L.C.

(57) ABSTRACT

There is provided a preview distribution technique capable of realizing a flexible preview distribution between a distribution side and a user side. According to the technique, preview meta data describing reference destination information to the preview-constituting data of a plurality of types constituting the content preview is transmitted to a reception terminal. The reception terminal acquires the preview-constituting data by using the reference destination information described in the preview meta data and generates/reproduces the preview. Thus, when modifying the preview, the reception terminal can reproduce the preview after the modification, by acquiring only the data constituting the preview of the modified part, thereby easily modifying the data constituting the preview. That is, it is possible to perform a flexible preview distribution.

26 Claims, 9 Drawing Sheets

(51) Int. Cl.
*H04N 7/10* (2006.01)
*G06F 3/00* (2006.01)
*G06F 13/00* (2006.01)
*H04N 21/84* (2011.01)
*H04N 21/8549* (2011.01)
*H04N 21/8543* (2011.01)
*H04N 21/235* (2011.01)
*H04N 7/173* (2011.01)
*H04N 21/433* (2011.01)
*H04N 21/4722* (2011.01)

(52) U.S. Cl.
CPC ......... *H04N 21/8543* (2013.01); *H04N 21/235* (2013.01); *H04N 21/4331* (2013.01); *H04N 21/4722* (2013.01)
USPC .................. 725/41; 725/32; 725/39; 725/40; 725/42

(56) References Cited

U.S. PATENT DOCUMENTS

| | | |
|---|---|---|
| 2002/0035726 A1 | 3/2002 | Corl |
| 2002/0129371 A1* | 9/2002 | Emura et al. .................. 725/61 |
| 2003/0005429 A1* | 1/2003 | Colsey ............................ 725/8 |
| 2003/0110297 A1* | 6/2003 | Tabatabai et al. ............ 709/246 |
| 2004/0103120 A1 | 5/2004 | Fickle et al. |
| 2004/0194127 A1 | 9/2004 | Patton et al. |
| 2005/0005308 A1* | 1/2005 | Logan et al. .................. 725/135 |
| 2005/0155078 A1* | 7/2005 | Imada et al. .................. 725/114 |
| 2005/0160452 A1* | 7/2005 | Lawler et al. .................. 725/38 |
| 2006/0020962 A1* | 1/2006 | Stark et al. .................... 725/32 |
| 2006/0107301 A1* | 5/2006 | Leibbrandt et al. ........... 725/134 |
| 2007/0028264 A1* | 2/2007 | Lowe .............................. 725/35 |
| 2007/0124359 A1 | 5/2007 | Hwang et al. |

FOREIGN PATENT DOCUMENTS

| | | |
|---|---|---|
| JP | 2002-335519 | 11/2002 |
| JP | 2002335519 | 11/2002 |
| JP | 2003-523663 | 8/2003 |
| JP | 2003523663 | 8/2003 |
| JP | 2004-194252 | 7/2004 |
| JP | 2004194252 | 7/2004 |
| JP | 2004-304791 | 10/2004 |
| JP | 2004282634 | 10/2004 |
| JP | 2004304791 | 10/2004 |
| WO | 200045593 | 8/2000 |
| WO | 0158162 | 8/2001 |
| WO | 2004/051475 | 6/2004 |
| WO | 2004051475 | 6/2004 |

OTHER PUBLICATIONS

English language Abstract of JP 2004-282634.
Van Beek et al., Metadata-driven multimedia access, IEEE Signal Processing Magazine, Mar. 2003, vol. 20, No. 2, pp. 40 to 52.
E.P.O. Office action, mail date is May 16, 2011.
Kameyama, "Ubiquity and Content/Image Information Processing", Eizo Joho Media Gakkaishi, Japan, Eizo Joho Media Gakkai, vol. 59, No. 1, pp. 21-25 (Jan. 2005), together with its English language partial translation.
Maghalaes J. et al., "Using MPEG standards for multimedia customization", Signal Processing, Image Communications, Elservier Science, vol. 19, No. 5, pp. 437-456 (2004).

* cited by examiner

```
<?xml version="1.0" encoding="UTF-8"?>
<xs:schema xmlns:xs="http://www.w3.org/2001/XMLSchema"
elementFormDefault="qualified" attributeFormDefault="unqualified">
  <xs:element name="PreviewData" type="PreviewDataType"/>
  <xs:complexType name="PreviewDataType">
    <xs:sequence>
      <xs:element name="PreviewDataID" type="xs:string"/>                    ~301
      <xs:element name="Version" type="xs:unsignedShort"/> ~331         302
      <xs:element name="ValidTime" type="ValidTimeType" minOccurs="0"/>
      <xs:element name="SMIL" type="SMILType" minOccurs="0"/>~303
      <xs:element name="Video" type="VideoType" minOccurs="0"/>~304
      <xs:element name="Audio" type="AudioType" minOccurs="0"/>~305
      <xs:element name="Picture" type="PictureType" minOccurs="0"/>~306
      <xs:element name="Text" type="TextType" minOccurs="0"/>~307    308
      <xs:element name="AccessObject" type="AccessObjectType" minOccurs="0"/>
    </xs:sequence>
  </xs:complexType>
  <xs:complexType name="ValidTimeType">
    <xs:sequence>                    310
      <xs:element name="StartTime" type="StartTimeType" minOccurs="0"/>
      <xs:element name="EndTime" type="xs:dateTime" minOccurs="0"/>      }309
    </xs:sequence>            311
  </xs:complexType>
  <xs:complexType name="StartTimeType">
    <xs:complexContent>
      <xs:extension base="xs:dateTime">
        <xs:attribute name="autoStart" type="xs:boolean"/>           }312
      </xs:extension>
    </xs:simpleContent>
  </xs:complexType>
  <xs:complexType name="SMILType">
    <!--SMIL Description is added in-->    }313
  </xs:complexType>
```

FIG.3

```
<xs:complexType name="VideoType>
    <xs:sequence>      315
        <xs:element name="VideoURI" type="xs:anyURI"/>
        <xs:element name="Codec" type="xs:string"/> ~316
        <xs:element name="AlternativeText" type="TextType" minOccurs="0"/>
        <xs:element name="AlternativePicture" type=PictureType" minOccurs="0"/>
    </xs:sequence>           318              317
</xs:complexType>
<xs:complexType name="AudioType">
    <xs:sequence>
        <xs:element name="AudioURI" type="xs:anyURI>  ~320
        <xs:element name="Codec" type="xs:string"/> ~321
        <xs:element name="AlternativeText" type="TextType" minOccurs="0"/>
        <xs:element name="AlternativePicture" type=PictureType" minOccurs="0"/>
    </xs:sequence>           323              322
</xs:complexType>
<xs:complexType name="PictureType">
    <xs:sequence>      325
        <xs:element name="PictureURI" type="xs:anyURI>
        <xs:element name="Codec" type="xs:string"/> ~326
        <xs:element name="AlternativeText" type="TextType" minOccurs="0"/>
    </xs:sequence>           327
</xs:complexType>
<xs:complexType name="TextType">
    <xs:attribute name="lang" type="xs:language"/> ~330
    <xs:attribute name="font" type="xs:string"/> ~332
    <xs:attribute name="color" type="xs:string"/> ~333
    <xs:attribute name="size" type="xs:string"/> ~334
</xs:complexType>
<xs:complexType name="AccessObjectType">
    <xs:sequence>
        <xs:element name="ServiceID" type="xs:string">
    </xs:sequence>
</xs:complexType>
</xs:schema>
```

314: VideoType block
319: AudioType block
324: PictureType block
328: TextType block
335: AccessObjectType block

FIG.4

```
                                               500
<PreviewData><PreviewDataID>1234</PreviewDataID>  ~501
    <Version>1.0</Version> ~502
                                        504
        <ValidTime>
            <StartTime autoStart="true">200501300000</StartTime>     } 503
            <EndTime>200502300000</EndTime>
        </ValidTime>         505
    <SMIL>
        <Head><Switch>
              <Layout systemBitrate="2000">
        507 {    <Root-layout width="320" height="480" />
                 <Region id="a" top="5" />
              </Layout>
                                                                    } 506
              <Layout systemBitrate="16000">
        508 {    <Root-layout width="400" height="600" />
                 <Region id="a" top="6" />
              </Layout>
            </Switch></Head>
        <Body>
            <Text region="a" src="text.html" dur="10s" />
        <Body>
    </SMIL>
    <Video>
        <URI>esg:video ○○○ 01</URI>  ~510
        <Codec>mpeg1</Codec> ~511    517
        <AlternativeText lang="eng" color="blue"> × × × Cartoon Movie</AlternativeText>  } 512
        <AlternativePicture>  515   516
            <PictureURI>esg:picture ○○○ 02</PictureURI>                          } 513    } 509
            <Codec>jpeg</Codec> ~518  521
        522 <AlternativeText lang="eng"> × × × Cartoon Movie</AlternativeText>
        </AlternativePicture>    519      520
    </Video>
    <Text lang="eng" color="red" size="5">Welcome to × × × World!</Text>  } 514
</PreviewData>       524      525      526   523
```

```
<?xml version="1.0" encoding="UTF-8">
<ServiceDescription
    xmlns="www.example.com/3gppUserServiceDescription"
    xmlns:xsi="http://www.w3.org/2001/XMLSchema-instance"
    serviceId="urn:3gpp:1234567890coolcat">
        <name lang="EN">something in english</name>  ~ 601
        <serviceLanguage>EN</serviceLanguage>  ~ 602
        <deliveryMethod
sessionDescriptionURI="http://www.example.com/3gpp/mbms/session1.sdp"/>~ 603
        <PreviewDataID>P1</PreviewDataID>  ~ 604
</ServiceDescription>
```

FIG.6

DISTRIBUTION DEVICE AND RECEPTION DEVICE

TECHNICAL FIELD

The present invention relates to a distributing apparatus that distributes a preview of content, and a receiving apparatus.

BACKGROUND ART

In recent years, in a broadcast receiving terminal such as a television, a program guide that displays information such as program channels, broadcast times and content, is realized. As a function of the program guide, for example, a preview that introduces a program by displaying a part of the program video has been proposed.

For example, Patent Document 1 discloses a technique of adding data indicating a part of a program video to meta data relating to the program, transmitting the data to a receiving terminal, and thereby creating a preview for displaying a part of the program video corresponding to the data.

Further, Patent Document 2 discloses a technique of adding information relating to given content to meta data corresponding to another content. That is, the technique realizes preview distribution by adding information relating to the main program content (for example, the reception method of the main program content) to meta data corresponding to the program preview.

Thus, the preview indicating an outline of the program content is distributed to the user before distribution of the program content. The user grasps an outline of the program content by referring to the preview and requests distribution of the program content. By this means, the user can identify the desired program content, so that the user can cut wasteful spending on program content that charges a fee, for example.
Patent Document 1: International Patent No. WO00/45593
Patent Document 2: Japanese Patent Application Laid-open No. 2004-282634

DISCLOSURE OF THE INVENTION

Problems to be Solved by the Invention

However, in the technique disclosed in Patent Document 1, there is a problem that the entire program video must be received assuming that the preview corresponding to the data indicating a part of the program video is cut out and displayed. Further, the preview is limited to the video stream that is cut out from the program video, and therefore there is a fixed limitation in the variations of preview content.

With the technique disclosed in Patent Document 2, the preview and the meta data corresponding to the preview are generated and distributed to the receiving terminal. As a result, each time the preview and the information added to the preview are changed, the entity of the new preview that includes unchanged parts must be regenerated and redistributed. This results in the problem of an increase in transmission capacity. That is, the preview of parts other than the part the user truly desires to view must be distributed between the distributing side and user side, resulting in the problem of a lack of flexibility.

The present invention has been implemented taking into consideration the problems described above, and it is therefore an object of the present invention to provide a distributing apparatus, receiving apparatus and distribution system capable of realizing flexible preview distribution between a distributing side and user side, and a distribution method, reception method and transmission and reception method thereof.

Means for Solving the Problem

The distributing apparatus of the present invention employs a configuration having: a preview meta data managing section that manages preview meta data that describes reference destination information for preview-constituting data that constitutes content preview data; and a transmitting section that transmits the preview meta data.

The receiving apparatus of the present invention employs a configuration having: a receiving section that receives preview meta data that describes reference destination information for preview-constituting data that constitutes content preview data; a preview-constituting data acquiring section that acquires the preview-constituting data using the reference destination information described in the preview meta data; and a preview generating section that generates the preview data based on the preview-constituting data.

The distribution system of the present invention employs a configuration having a distributing apparatus and a receiving apparatus, wherein: the distributing apparatus has: a preview meta data managing section that manages preview meta data that describes reference destination information for preview-constituting data that constitutes content preview data; and a transmitting section that transmits the preview meta data; and the receiving apparatus has: a receiving section that receives the preview meta data transmitted from the distributing apparatus; a preview-constituting data acquiring section that acquires the preview-constituting data using the reference destination information described in the preview meta data; and a preview generating section that generates the preview based on the preview-constituting data.

The distribution method of the present invention has a step of transmitting preview meta data that describes reference destination information for preview-constituting data that constitutes content preview data.

The reception method of the present invention has the steps of: receiving preview meta data that describes reference destination information for preview-constituting data that constitutes content preview data; acquiring the preview-constituting data using the reference destination information described in the preview meta data; and generating the preview data based on the preview-constituting data.

The transmission and reception method of the present invention has the steps of: transmitting preview meta data that describes reference destination information for preview-constituting data that constitutes content preview data from a distributing apparatus; receiving the preview meta data transmitted from the distributing apparatus at a receiving apparatus; acquiring the preview-constituting data using the reference destination information described in the preview meta data at the receiving apparatus; and generating the preview data based on the preview-constituting data at the receiving apparatus.

Advantageous Effect of the Invention

According to the present invention, even when a preview is changed, a receiving apparatus can acquire only data constituting the preview of a changed part and play back the changed preview, so that flexible preview distribution can be realized.

BRIEF DESCRIPTION OF DRAWINGS

FIG. 3 shows an example of a schema of the preview meta data of the embodiment;

FIG. 4 shows an example of a schema of the preview meta data of the embodiment, continued from FIG. 3;

FIG. 5 shows an example of a description of the preview meta data of the embodiment;

FIG. 6 shows an example of a description of a service description of the embodiment;

BEST MODE FOR CARRYING OUT THE INVENTION

Now embodiments of the present invention will be described in detail with reference to the accompanying drawings.

In the present specification, data of the overall preview is referred to as "preview data," data constituting the data of the overall preview is referred to as "preview-constituting data," and data that includes reference destination information for the preview-constituting data is referred to as "preview meta data."

Further, "preview data" is multimedia data comprised of various elements called "preview-constituting data," including moving picture, audio, still image and text, and realizes a multimedia preview comprised of one of the various elements or a combination of the elements.

Figure 1:
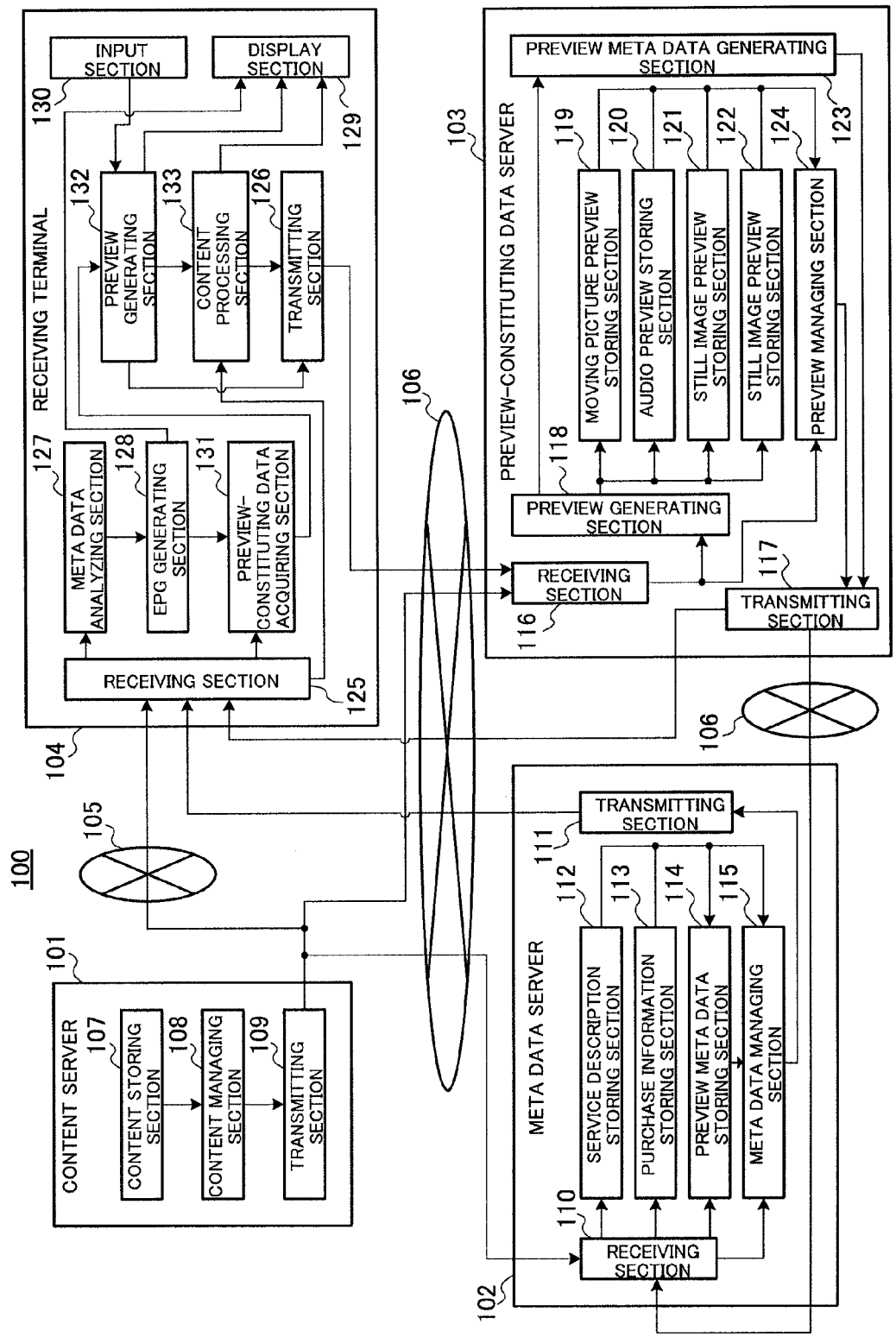
FIG. 1 shows a configuration of a content distribution system that includes a distribution system according to an embodiment of the present invention.

First, a configuration of a content distribution system according to this embodiment will be described using FIG. 1.

Content distribution system 100 according to this embodiment employs a configuration where content server 101 that distributes content such as programs, meta data server 102 that distributes meta data relating to the content, preview-constituting data server 103 that distributes a preview relating to the content, and receiving terminal 104 that receives content, meta data and preview data, are connected via broadcast network 105 and communication network 106.

Furthermore, content distribution system 100 includes both broadcast network 105 and communication network 106, but may use only broadcast network 105 or only communication network 106. Further, communication network 106 is used between content server 101 and meta data server 102, but it is also possible to use broadcast network 105. Further, communication network 106 is used between content server 101 and preview-constituting data server 103, but it is also possible to use broadcast network 105. Further, although communication network 106 is used between meta data server 102 and preview-constituting data server 103 and receiving terminal 104, it is also possible to use broadcast network 105. Furthermore, the meta data broadcasted from meta data server 102 to receiving terminal 104 is sometimes also generally referred to as a service guide.

First, the configuration of content server 101 will be described.

Content server 100 has content storing section 107 that stores a plurality of content for distribution. Content storing section 107 is configured with a large-capacity storage medium and the like.

Further, content server 101 has content managing section 108 that manages the content stored in content storing section 107. Content managing section 108 selects the content to be distributed, determines the content distribution destination, and manages information such as the identification information that identifies the meta data corresponding to the content. Further, content managing section 108 transmits to transmitting section 109 the identification information of the meta data corresponding to the distributed content.

Further, content server 101 has transmitting section 109. Transmitting section 109 distributes the content to receiving terminal 104 through broadcast network 105, transmits information that identifies the meta data corresponding to the content to meta data server 102 through communication network 106, and distributes the content to preview-constituting data server 103 through communication network 106. Transmitting section 109 has a communication function using broadcast network 105 and a communication function using communication network 106.

Content server 101 is configured as described above.

Next, the configuration of meta data server 102 will be described.

Meta data server 102 handles service description, purchase information and preview meta data, for example, as content meta data. The service description is information relating to the content. Further, the service description is information that describes the content title, cast members, time, genre and the content access information (such as the channel number, IP address and port number), or information that includes the reference destination information for data constituting this service description. The purchase information is information relating to the content purchasing method or information that includes the reference destination information of this information. The preview meta data is information relating to the content preview or information that includes the reference destination information of preview-constituting data (details described later).

Furthermore, the meta data handled by meta data server 102 is not limited to these, and may be data relating to the content.

Meta data server 102 has, as a meta data storage means, service description storing section 112 that stores a service description, purchase information storing section 113 that stores purchase information, and preview meta data storing section 114 that stores preview meta data.

The service description stored in service description storing section 112 and the purchase information stored in purchase information storing section 113 may be provided from content server 101, may be provided from another external apparatus not shown, or may be provided through a user input operation.

Further, meta data server 102 has receiving section 110 and transmitting section 111 as a communication means using communication network 106. Furthermore, meta data server 102 has a communication function using broadcasting when meta data server 102 is connected to another apparatus using broadcast network 105.

That is, the concept of "distribution" in the present specification includes both distribution using communication and distribution using broadcasting.

Receiving section 110 receives information which identifies the meta data corresponding to the content and is transmitted from content server 101, and transmits the received information to meta data managing section 115. Further, receiving section 110 receives the preview meta data (details described later) transmitted from preview-constituting data server 103, and stores the received preview meta data in preview meta data storing section 114.

In the preview meta data stored in preview meta data storing section 114, purchase information and a service description which can be associated with each other by information (such as the reference destination information of preview-constituting data) included in the preview meta data, are associated with each other. For example, when the preview meta data relating to the preview data of specific content is stored in preview meta data storing section 114 and the purchase information of the specific content is stored in purchase information storing section 113, the preview meta data and purchase data are associated with each other (a link is established). That is, preview meta data storing section 114 has a function of managing the correspondence relationship between the preview meta data and other information.

Furthermore, the preview meta data and information such as service description and purchase information are associated using an arbitrary method. This association can be added, deleted and changed.

Meta data managing section 115 manages the preview meta data in which predetermined information is described on a per type basis, such as moving picture, audio, still image and text. Further, meta data managing section 115 analyzes the information for identifying the meta data received by receiving section 110, that is, the information for identifying the meta data corresponding to the content to be distributed by content server 101. Then, meta data managing section 115 extracts according to the analysis result the meta data (service description, purchase information and preview meta data) corresponding to the content to be distributed, and transmits the extracted meta data to transmitting section 111.

That is, meta data managing section 115 generates meta data comprised of the preview meta data, service description and purchase information corresponding to the content to be distributed, from the various information stored in service description storing section 112, purchase information storing section 113 and preview meta data storing section 114. Then, meta data managing section 115 temporarily stores the generated meta data as meta data to be transmitted to receiving terminal 104.

In other words, meta data managing section 115 prepares as meta data to be transmitted to receiving terminal 104 the preview meta data corresponding to the content to be distributed and the meta data comprised of a service description and purchase information, which are preview meta data additional information. Here, what additional information is to be included in the preview meta data may be flexibly determined according to settings which are performed between the transmitting side and receiving side, reception environments of the receiving side, requests from the user, or the like.

Transmitting section 111, under the management of meta data managing section 115, transmits to receiving terminal 104 meta data (service description, purchase information and preview meta data). At this time, it is not necessary to transmit all information of service description, purchase information and preview meta data as meta data, as described above, and the information to be transmitted may be changed as appropriate. For example, meta data comprised of preview meta data and a service description may be transmitted.

Meta data server 102 is configured as described above.

Next, the configuration of preview-constituting data server 103 will be described.

Preview-constituting data server 103 has receiving section 116 and transmitting section 117 as a communication means using communication network 106. Furthermore, preview-constituting data server 103 has a communication function using broadcasting when preview-constituting data server 103 is connected to another apparatus using broadcast network 105.

Receiving section 116 receives the content transmitted from content server 101, and transmits the received content to preview generating section 118.

Preview generating section 118 generates preview data using the received content. Specifically, preview generating section 118 generates a moving picture preview, audio preview, still image preview and text preview, which are the preview-constituting data indicating a content outline, and the layout information of these preview-constituting data. Then, preview generating section 118 transmits the generated moving picture preview to moving picture preview storing section 119, the generated audio preview to audio preview storing section 120, the generated still image preview to still image preview storing section 121, and the generated text preview to text preview storing section 122.

Further, preview generating section 118 transmits information relating to the generated moving picture preview, audio preview, still image preview and text preview, and the temporal and spatial layout information of these preview-constituting data to preview meta data generating section 123. Further, when the received content includes the identification information of the meta data (service description and purchase information) relating to the content, preview generating section 118 also transmits the identification information to preview meta data generating section 123.

Furthermore, the processing for generating the preview data from the content by preview generating section 118 has been conventionally proposed, and a detailed description thereof will be omitted.

Moving picture preview storing section 119 stores the moving picture preview from preview generating section 118. Audio preview storing section 120 stores the audio preview from preview generating section 118. Still image preview storing section 121 stores the still image preview from preview generating section 118. Text preview storing section 122 stores the text preview from preview generating section 118.

Further, preview meta data generating section 123 generates the preview meta data from the information relating to the moving picture preview, audio preview, still image preview and text preview transmitted from preview generating section 118, and the temporal and spatial layout information of these preview-constituting data. Then, preview meta data generating section 123 transmits the generated preview meta data to meta data server 102 via transmitting section 117.

The preview meta data describes the reference destination information, layout information, and the like of the moving picture preview, audio preview, still image preview and text preview. The preview meta data will be described in detail later.

Further, preview-constituting data server 103 has preview managing section 124. Preview managing section 124 receives a request for distributing the moving picture preview, audio preview, still image preview and text preview transmitted from receiving terminal 104 via receiving section 116, and extracts the moving picture preview, audio preview, still image preview and text preview corresponding to the distribution request from moving picture preview storing section 119, audio preview storing section 120, still image preview storing section 121 and text preview storing section 122.

Then, preview managing section 124 transmits the extracted data to receiving terminal 104 via transmitting section 117.

Preview-constituting data server 103 is configured as described above. Furthermore, in this embodiment, preview-constituting data server 103 receives content and generates preview data, but preview-constituting data server 103 may receive preview data. In this case, preview generating section 118 is not needed.

Next, the configuration of receiving terminal 104 will be described.

Receiving terminal 104 has receiving section 125 and transmitting section 126 as a communication means having functions using broadcast network 105 and communication network 106. Furthermore, receiving terminal 104 has only a communication function using broadcast network 105 when receiving terminal 104 is connected to another apparatus using broadcast network 105, and has only a communication function using communication network 106 when receiving terminal 104 is connected to another apparatus using communication network 106.

Further, receiving terminal 104 has meta data analyzing section 127 that acquires meta data (service description, purchase information and preview meta data) transmitted from meta data server 102 via receiving section 125. Meta data analyzing section 127 analyzes the meta data. Then, meta data analyzing section 127 acquires information relating to the content included in the meta data, such as information relating to the preview, the content title, channel, cast members and purchasing, for example, and transmits the acquired information to EPG (Electronic Program Guide) generating section 128.

EPG generating section 128 generates an EPG based on the information transmitted from meta data analyzing section 127 and transmits the generated EPG to display section 129. In the EPG, the information relating to the content (such as a preview) is arranged at the inserting point of rectangles which have channel information on the horizontal axis and time on the vertical axis. The EPG will be described in detail later.

Display section 129 displays the EPG transmitted from EPG generating section 128, and information such as the preview data transmitted from preview generating section 132 and the content transmitted from content processing section 133 described later.

Further, receiving terminal 104 has input section 130 for the user to perform various inputs relating to processing such as content download and preview data distribution.

Further, receiving terminal 104 has preview-constituting data acquiring section 131. Preview-constituting data acquiring section 131 uses the reference destination information of the preview-constituting data described in the preview meta data transmitted from meta data server 102 via receiving section 125 and acquires the preview-constituting data. Specifically, preview-constituting data acquiring section 131 acquires via receiving section 125 the preview-constituting data transmitted from preview-constituting data server 103 that receives a request for distributing the preview from receiving terminal 104.

Further, receiving terminal 104 has preview generating section 132. Preview generating section 132 generates the preview data selected using input section 130 by the user who views the EPG. Specifically, first preview generating section 132 analyzes the preview meta data corresponding to the preview data selected by the user, and identifies the moving picture preview, audio preview, still image preview and text preview which are the preview-constituting data that constitutes the preview data. Then, preview generating section 132 transmits the request for distributing the moving picture preview, audio preview, still image preview and text preview that constitute the preview data to preview-constituting data server 103 via transmitting section 126. Then, preview generating section 132 receives the request for distributing the preview-constituting data acquired by preview-constituting data acquiring section 131, and generates a preview based on the preview-constituting data transmitted from preview-constituting data server 103. Preview data is generated by sorting the moving picture preview, audio preview, still image preview and text preview transmitted from preview-constituting data server 103 based on the positional and temporal layout information described in the preview meta data. Preview generating section 132 transmits the generated preview data to display section 129.

Furthermore, preview-constituting data acquiring section 131 and preview generating section 132 may be integrally configured.

Further, according to the reception performance and reception environments of receiving terminal 104, a preview distribution request generating section (not shown) that automatically generates a request for distributing preview-constituting data may be provided.

Further, receiving terminal 104 has content processing section 133. Content processing section 133 converts the content received via receiving section 125 to a form that can be displayed by display section 129, and transmits the converted content to display section 129.

Receiving terminal 104 is configured as described above. Furthermore, in this embodiment, receiving terminal 104 acquires the moving picture preview, audio preview, still image preview and text preview used for the preview when necessary, but receiving terminal 104 may receive in advance and accumulate the moving picture preview, audio preview, still image preview and text preview. This is preferable when the moving picture preview, audio preview, still image preview and text preview are unilaterally transmitted through broadcasting, or the like. Further, in this case, it is preferable to store the data used for the preview, service description and purchase information in association with each other on a per content basis.

Next, the preview meta data generated by preview meta data generating section 123 will be described. First, an outline of the preview meta data will be described using FIG. 2.

Figure 2:
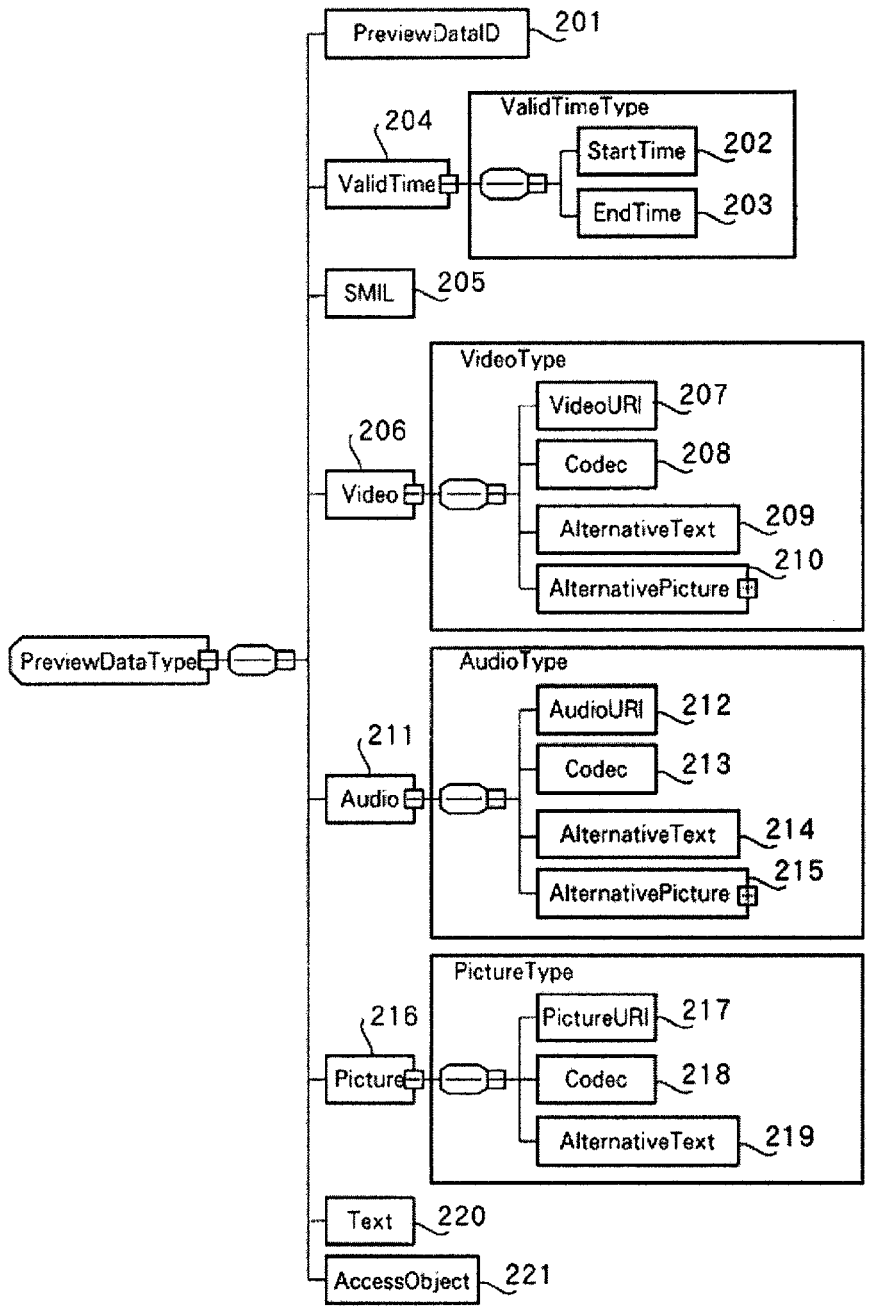
FIG. 2 shows an outline of preview meta data of the embodiment.

As shown in FIG. 2, in preview meta data 200, identification number 201 of the preview meta data is described.

Further, in preview meta data 200, validity period information 204 is described. In validity period information 204, start time 202 indicating the start time at which use is permitted, and end time 203 indicating the expiration time, are described.

Further, in preview meta data 200, layout information 205 that indicates the temporal and spatial layout of the moving picture (preview-constituting data) audio (preview-constituting data), still image (preview-constituting data) and text (preview-constituting data) is described. Layout information 205 is described using the international standard SMIL (Synchronized Multimedia Integration Language). Layout information 205 enables a complicated and rich configuration of data used for the preview. Further, layout information 205 is described based on the international standard and therefore has versatility.

Further, in preview meta data 200, moving picture information 206 relating to the moving picture (preview-constituting data) is described. Moving picture information 206 is comprised of reference destination information 207 for the moving picture, codec 208 that indicates the compression method of the moving picture, and alternative text 209 and alternative still image 210 that are played back in place of the moving picture when the moving picture cannot be played back.

Reference destination information 207 indicates the storage destination of the moving picture preview, and, in this case, is the reference destination address such as a URI relating to moving picture preview storing section 119 of preview-constituting data server 103.

In this way, in moving picture information 206, reference destination information 207 of the data constituting the moving picture preview is described instead of the entity of the moving picture preview. Thus, the moving picture preview is changed by changing reference destination information 207 or by changing the moving picture preview stored in the link destination of reference destination information 207. This results in significant reduction in the amount of transmitted data compared to the conventional method of also transmitting the unchanged data when only the moving picture preview is changed. As a result, communication network constriction is prevented, and communication efficiency is improved. Further, the moving picture preview is stored in the reference destination, so that the moving picture preview can be shared with the previews of other content. This also results in reduction in the storage area for the moving picture preview.

Further, even when the moving picture cannot be played back, preview data that is based on text and a still image can be generated using alternative text 209 and alternative still image 210, so that it is possible to grasp an outline of the content based on this preview data. In this way, it is possible to perform preview distribution compatible with the function of receiving terminal 104, that is, flexible preview distribution. Further, in alternative text 209 and alternative still image 210, the entity of the text preview and still image preview may be described, or the storage destinations of the still image preview and text preview, and, in this case, the reference destination addresses such as the URIs of still image preview storing section 121 and text preview storing section 122 of preview-constituting data server 103 may be described.

Further, in preview meta data 200, audio information 211 relating to the audio (preview) is described. Audio information 211 is comprised of reference destination information 212 for the audio, codec 213 that indicates the compression method of the audio, and alternative text 214 and alternative still image 215 that are played back in place of the audio when the audio cannot be played back.

Reference destination information 212 indicates the storage destination of the audio preview, and, in this case, indicates the reference destination address such as the URI relating to audio preview storing section 120 of preview-constituting data server 103.

In this way, in audio information 211, reference destination information 212 of the data constituting the audio preview is described instead of the entity of the audio preview. Thus, only the audio preview is changed by changing reference destination information 212 or by changing the audio preview stored in the link destination of reference destination information 212. This significantly reduces the amount of data compared to the conventional method of also transmitting unchanged data when only the audio preview is changed. As a result, communication network constriction is prevented, and communication efficiency is improved. Further, the audio preview is stored in the reference destination, so that the audio preview can also be shared with other content previews. This also results in reduction in the storage area for the audio preview.

Further, when the audio cannot be played back, preview data based on text and still image can be generated using alternative text 209 and alternative still image 210. The content outline can be grasped from this preview data. In this way, it is possible to perform preview distribution compatible with the function of receiving terminal 104, that is, flexible preview distribution. Further, in alternative text 214 and alternative still image 215, the entity of the text preview and still image preview may be described, or the storage destinations of the still image preview and text preview, and, in this case, the reference destination addresses such as the URIs of still image preview storing section 121 and text preview storing section 122 of preview-constituting data server 103 may be described.

Further, in preview meta data 200, still image information 216 relating to the still image preview or alternative still image is described. Still image information 216 is comprised of reference destination information 217 for the still image, codec 218 for converting the still image to a form that can be displayed, and alternative text 219 that is displayed in place of the still image when the still image cannot be displayed.

Reference destination information 217 indicates the storage destination of the still image preview or alternative still image, and, in this case, indicates the reference destination address such as the URI relating to still image preview storing section 121 of preview-constituting data server 103.

Thus, by describing reference destination information 217 constituting the still image preview or alternative still image in still image information 216 instead of the entity of the still image preview or alternative still image, when only the still image preview is changed, it is only necessary to change reference destination information 217 or change only the still image preview stored in the link destination of reference destination information 217. This significantly reduces the amount of data compared to the conventional method of also transmitting unchanged data when only the still image preview is changed. As a result, communication network constriction is prevented, and communication efficiency is improved. Further, the still image preview or alternative still image is stored in the reference destination, and therefore the still image preview or alternative still image can also be shared with other content previews. This also results in reduction in the storage area for the still image preview or alternative still image.

Further, even when the still image cannot be displayed, preview data based on text can be generated using alternative text 219, so that it is possible to grasp an outline of the content by this preview data. In this way, it is possible to perform preview distribution compatible with the function of receiving terminal 104, that is, flexible preview distribution. Further, in alternative text 219, the entity of the text preview or the storage destination of the text preview, and, in this case, the reference destination address such as the URI relating to text preview storing section 122 of preview-constituting data server 103 may be described.

Further, in preview meta data 200, text information 220 relating to the text preview or alternative text is described. Text information 220 may be the text or a reference destination address such as the URI relating to text preview storing section 122 of preview-constituting data server 103.

Further, in preview meta data 200, access object 221, which is information of the relevant meta data is described. Access object 221 includes a relevant service description, the identification information of purchase information, the reference destination information for relevant meta data. Further, the information of relevant meta data is not only described in preview meta data 200, but also in the service description, purchase information and other relevant meta data.

This makes it possible to provide a service with high volumes of meta data such as service descriptions and purchase information. For example, after the user refers to a service description and grasps the content of the service, the user can refer to the preview data based on the preview meta data in the service description. Furthermore, if the user likes the preview content, the user can also refer to the purchase information based on the purchase information in the preview meta data. Further, when a plurality of previews exist for the same content, these previews may also be associated.

Furthermore, it is possible to refer to the preview meta data from the service description, purchase information and other relevant meta data. This makes it possible to provide a service with high volumes of meta data such as service descriptions and purchase information.

As described above, by referring to preview meta data 200, it is possible to constitute preview data that intricately combines moving picture preview-constituting data, audio preview-constituting data, still image preview-constituting data and text preview-constituting data. Further, in preview meta data 200, the reference destination information of the preview-constituting data of the moving picture preview, audio preview, still image preview and text preview is described instead of the entity of these previews. By this means, when one of the moving picture preview, audio preview, still image preview and text preview is changed, it is only necessary to distribute only the changed moving picture preview, audio preview, still image preview or text preview. As a result, compared to the conventional method of distributing all preview data, the distributed data amount can be drastically reduced.

Next, the schema of preview meta data will be described using FIG. 3 and FIG. 4. Schema 300 of preview meta data is described using the international standard XML (eXtensible Markup Language). Thus, schema 300 is a general-purpose schema.

In schema 300 of the preview meta data, the element "PreviewDataID," which is the identification number of the preview meta data is defined as indicated by 301 in the figure. Further, in schema 300 of the preview meta data, the element "Version," which is the version information of the preview meta data is defined as indicated by 331 in the figure. Further, in schema 300 of the preview meta data, the element "ValidTime," which is the validity period information of the preview meta data is defined as indicated by 302 in the figure. In schema 300 of the preview meta data, the element "SMIL," which is the layout information of the preview meta data is defined as indicated by 303 in the figure. Further, in scheme 300 of the preview meta, the elements "Video" which is the moving picture information of the preview meta data is defined as indicated by 304 in the figure, "Audio" which is the audio information of the preview meta data is defined as indicated by 305 in the figure, "Picture" which is the still image information of the preview meta data is defined as indicated by 306 in the figure, and "Text" which is the text information of the preview meta data is defined as indicated by 307 in the figure. Further, in schema 300, "AccessObject" which is the access destination information when the preview is a low-rate video stream or the like, is defined as indicated by 308 in the figure.

Further, scheme 300 of the preview meta data defines the element "ValidTime" as having the sub-elements "StartTime" 310, which is the start time, and "EndTime" 311 as indicated by 309 in the figure. Further, schema 300 defines that the element "StartTime" 310 has the attribute "autoStart" as indicated by 312 in the figure. Here, when the attribute "autoStart" has the value "true," the preview automatically starts a playback at the time specified by "StartTime." When the attribute "autoStart" has the value "false," the element "StartTime" 310 simply indicates the start time of the preview validity period.

Further, schema 300 defines the element "SMIL" as indicated by 313 in the figure. Furthermore, the element "SMIL" is based on an international standard, and therefore a detailed description thereof will be omitted.

As indicated by 314 in the figure, schema 300 defines the element "Video" as having the sub-elements "VideoURI" 315 which indicates reference destination information, "Codec" 316 which indicates the compression method, "AlternativeText" 317 which indicates the alternative text, and "AlternativePicture" 318 which is the alternative still image. Further, "AlternativeText" 317 and "Alternative Picture" 318 are defined by "TextType" and "PictureType" described later.

As indicated by 319 in the figure, schema 300 defines the element "Audio," as having the sub-elements "AudioURI" 320 which indicates reference destination information, "Codec" 321 which indicates the compression method, "AlternativeText" 322 which indicates the alternative text and "AlternativePicture" 323 which is the alternative still image. Further, "AlternativeText" 322 and "Alternative Picture" 323 are defined by "TextType" and "PictureType" described later.

As indicated by 324 in the figure, schema 300 defines the elements "Picture" and "AlternativePicture" as having the sub-elements "PictureURI" 325 which indicates reference destination information, "Codec" 326 which indicates the compression method and "AlternativeText" 327 which indicates the alternative text. Further, "AlternativeText" 327 is defined by "TextType" described later.

As indicated by 328 in the figure, schema 300 defines the elements "Text" and "AlternativeText," as having the sub-elements "lang" 330 which indicates the language, "font" 332 which indicates the font, "color" 333 which indicates the color and "size" 334 which indicates the font size.

Further, schema 300 defines the element "AccessObject" as indicated by 335 in the figure. The element "AccessObject" can specify the identification information for the service description and purchase information, the reference destination information to the relevant meta data, and the like. Further, for example, the element "AccessObject" indicates the access destination information when the preview is a program comprised of a low-rate video stream. As an example of a description of access destination information, the Service ID held by the program for preview is described in the figure. The Service ID in the service description of the program described in FIG. 6 is specified as ServiceId="urn:3gpp:1234567890coolcat."

By using such schema 300, it is possible to describe rich preview meta data that intricately combines moving picture, audio, still image and text.

Next, a specific example of the preview meta data will be described using FIG. 5. Preview meta data 500 shown in FIG. 5 constitutes a description based on schema 300 shown in FIG. 3 and FIG. 4.

In preview meta data 500 shown in FIG. 5, "1234" is described as the element "PreviewDataID" as indicated by 501 in the figure. Further, in preview meta data 500, "1.0" is described as the element "Version" as indicated by 502 in the figure.

Further, in preview meta data 500, the element "ValidTime" is described as indicated by 503 in the figure. Further, "200501300000" is described as the sub-element "Start- Time" as indicated by 504 in the figure, and "200502300000" is described as the sub-element "EndTime" as indicated by 505 in the figure.

Further, in preview meta data 500, the element "SMIL" is described as indicated by 506 in the figure. In 507 in the figure, the configuration for a case where the communication network bit rate is "2000" is described, and in 508 in the figure, the configuration for a case where the communication network bit rate is "16000" is described.

Further, in preview meta data 500, the element "Video" is described as indicated by 509 in the figure. Further, in preview meta data 500, "esg:videoOOO01" is described as the sub-element "URI" as indicated by 510 in the figure, "mpeg1" is described as the sub-element "Codec" as indicated by 511 in the figure, the sub-element "AlternativeText" is described as indicated by 512 in the figure, and the sub-element "AlternativePicture" is described as indicated by 513 in the figure.

In "AlternativeText" 512, the element "XXX Cartoon Movie" is described as indicated by 517 in the figure. Further, in "AlternativeText" 512, "eng" is described as the attribute "lang" as indicated by 515 in the figure, and "blue" is described as the attribute "color" as indicated by 516 in the figure.

In "AlternativePicture" 513, "esg:pictureOOO02" is described as the sub-element "PictureURI" as indicated by 521 in the figure, "jpeg" is described as the sub-element "Codec" as indicated by 518 in the figure, and "AlternativeText" is described as the sub-element as indicated by 522 in the figure. Furthermore, in sub-element "AlternativeText" 522, "XXX Cartoon Movie" is described as indicated by 520 in the figure, and "eng" is described as the attribute "lang" as indicated by 519 in the figure.

Further, in the element "Text" indicated by 514 in the figure, "Welcome to XXX world!" is described as indicated by 523 in the figure. Further, "eng" is described as the attribute "lang" as indicated by 524 in the figure, "red" is described as the attribute "color" as indicated by 525 in the figure, and "5" is described as the attribute "size" as indicated by 526 in the figure.

As described above, in preview meta data 500, the reference destination information of these data is described instead of the entity of the moving picture, audio, still image or text constituting the preview data. Further, in preview meta data 500, the alternative data for a case where the moving picture cannot be played back is defined. Further, in preview meta data 500, the layout of the moving picture, audio, still image and text constituting the preview data is also described.

Next, the service description stored in service description storing section 112 of meta data server 102 will be described using FIG. 6.

In service description 600 shown in FIG. 6, text indicating the name of the content is described as indicated by 601 in the figure. In service description 600, the language in which the service is to be performed is described as indicated by 602 in the figure. In service description 600, the access destination information for receiving and referring to the service is described by the URI as indicated by 603 in the figure. In 603 in the figure, it is indicated that receiving terminal 104 receives a file that describes information such as the access destination IP address and port through broadcasting in the same way as the service description, and it is possible to refer to the file within receiving terminal 104 using the URI described in 603. Further, in service description 600, the ID of the relevant preview meta data is described as indicated by 604 in the figure. Thus, in service description 600, the identification information for the preview meta data, which is the relevant meta data, as well as information relating to the content are described.

Next, the EPG generated by EPG generating section 128 of receiving terminal 104 will be described with reference to FIG. 7.

Figure 7:
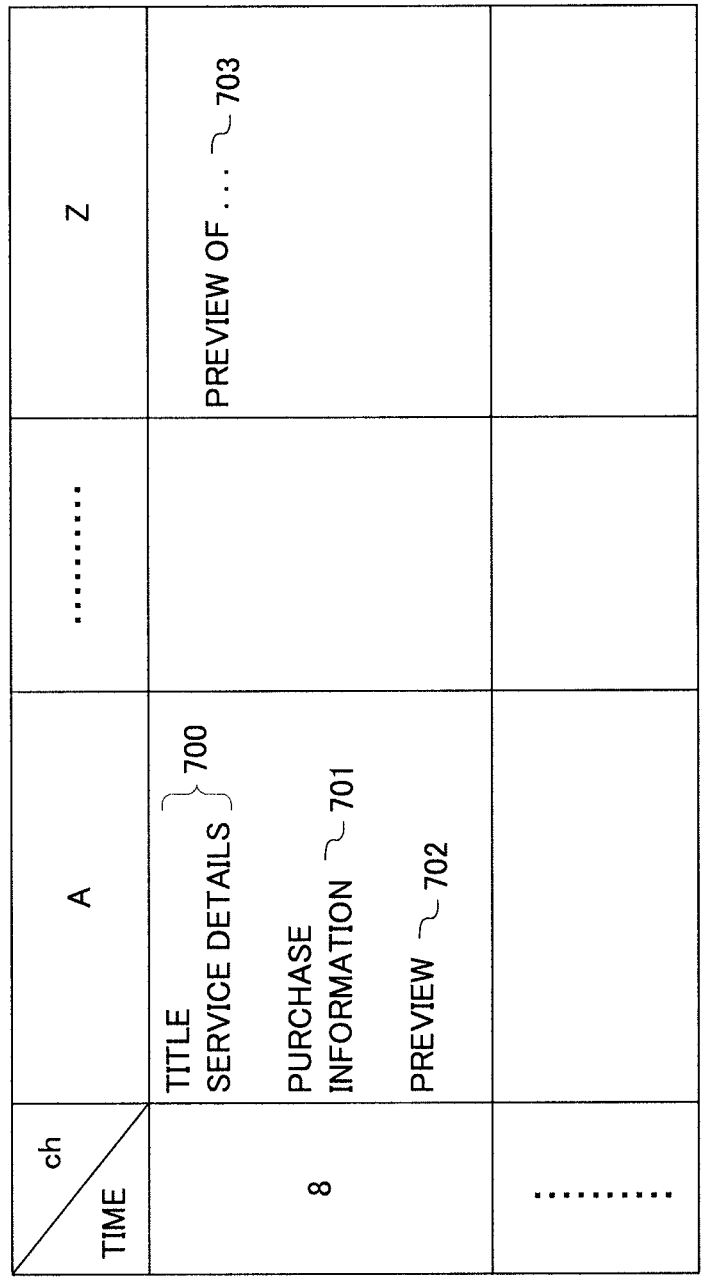
FIG. 7 shows an EPG of the embodiment.

As shown in FIG. 7, the EPG is a rectangular table with channels on the horizontal axis and time on the vertical axis. At the location where the vertical axis and horizontal axis intersect, information relating to the content broadcasted on the corresponding channel at the corresponding time is described.

Specifically, as the content information, information which can be extracted from the service description, such as indicated by 700 in the figure, information which can be extracted from purchase information, such as indicated by 701 in the figure, and information which can be extracted from preview meta data, such as indicated by 702 in the figure, are described.

Further, when information 700 extracted from the service information is selected by a mouse or the like, a screen (not shown) with more detailed service information is displayed. When information 701 extracted from the purchase information is selected by a mouse or the like, a screen (not shown) with more detailed purchase information is displayed. When information 702 extracted from the preview meta data is selected by a mouse or the like, meta data is generated, and a display screen (not shown) of the generated meta data is displayed.

Further, a preview dedicated channel such as indicated by 703 in the figure may be provided as a channel. By describing the preview dedicated channel in an access object of the preview meta data, it is possible to acquire pre-generated preview data without acquiring the moving picture, audio, and the like from the preview meta data and generating the preview data.

The EPG is configured as described above.

Figure 8:
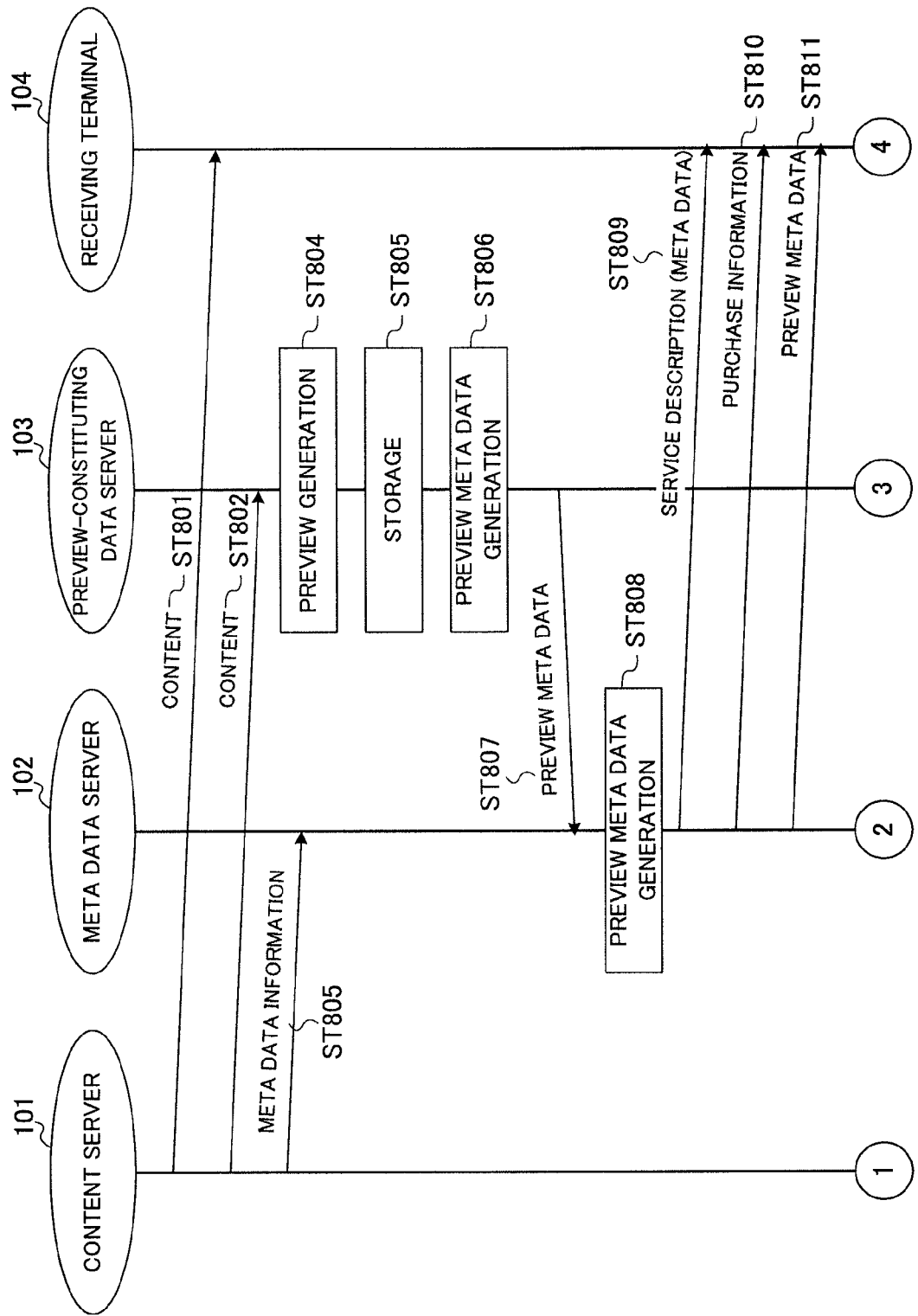
FIG. 8 shows the preview distribution operation of a content distribution system of the embodiment.
Figure 9:
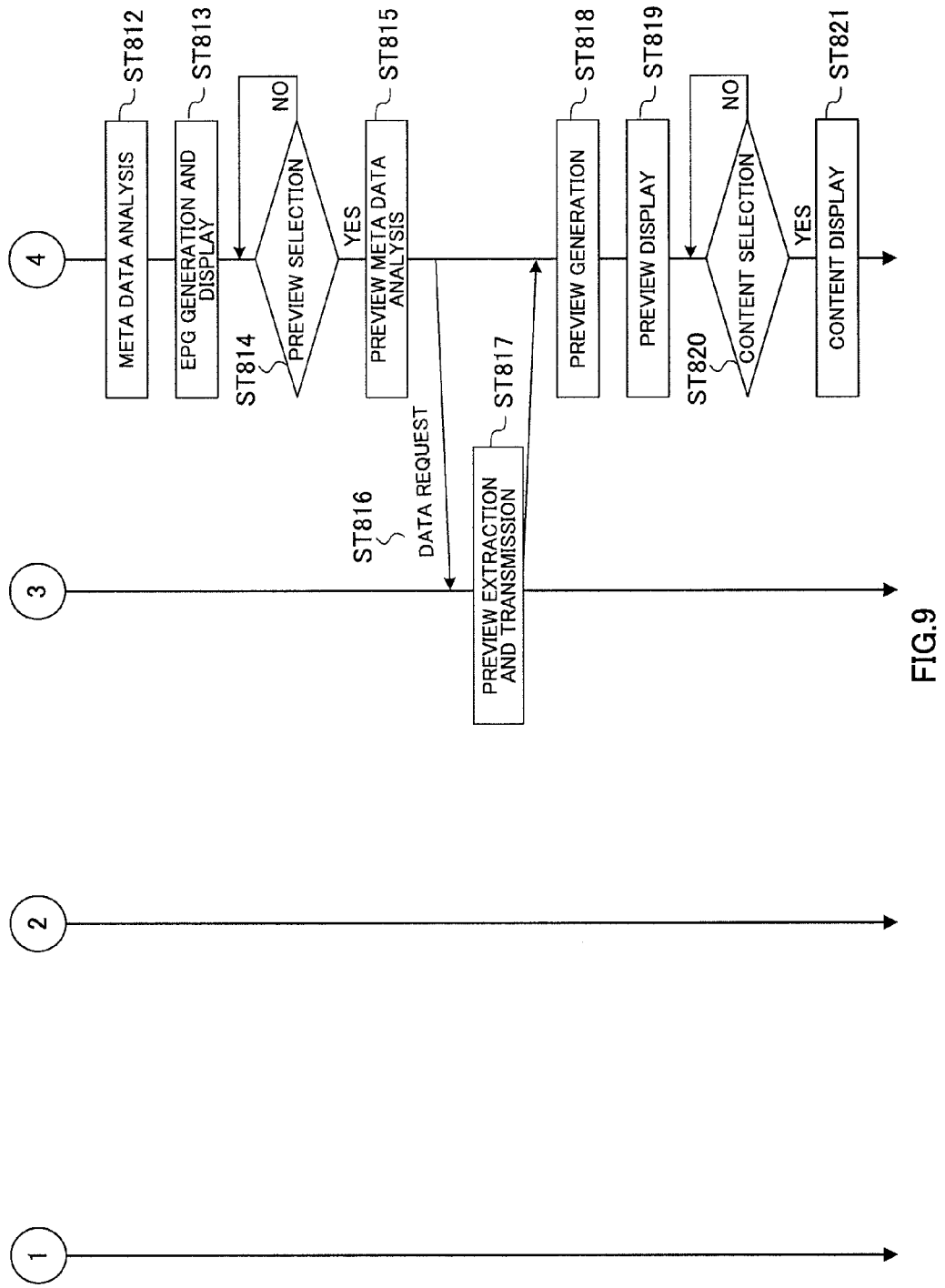
FIG. 9 is a sequence diagram showing the preview distribution operation of a content distribution system of the embodiment, continued from FIG. 8.

Next, the preview distribution operation of content distribution system 100 according to this embodiment will be described using the sequence diagrams shown in FIG. 8 and FIG. 9.

First, content managing section 108 of content server 101 extracts the content from content storing section 107. The extracted content is distributed via transmitting section 109 to receiving terminal 104 using broadcast network 105 and to preview-constituting data server 103 using communication network 106 (ST801 and ST802). Next, content managing section 108 transmits information for identifying the meta data (service description and purchase information) relating to the content transmitted in ST801 to meta data server 102 via transmitting section 109 using communication network 106 (ST803).

On the other hand, preview-constituting data server 103 receives the content in receiving section 116 and transmits the content to preview generating section 118. Then, preview generating section 118 generates preview data from the content using a predetermined method (ST804). Next, preview generating section 118 stores the moving picture preview, audio preview, still image preview and text preview, which are the preview-constituting data that constitutes the preview data, in moving picture preview storing section 119, audio preview storing section 120, still image preview storing section 121, and text preview storing section 122, respectively (ST805). Further, preview generating section 118 transmits the moving picture preview, audio preview, still image preview, text preview reference destination information, the temporal and spatial layout information of these preview-constituting data, the information relating to other corresponding meta data, validity period, version information, and the like to preview meta data generating section 123. Further, preview-constituting data server 103 may unilaterally transmit the generated moving picture preview, audio preview, still image preview and text preview to receiving terminal 104 by a broadcast network or the like. In this case, receiving terminal 104 may receive and accumulate the received moving picture preview, audio preview, still image preview and text preview.

On the other hand, preview meta data generating section 123 generates preview meta data 500 such as shown in FIG. 5, for example, using the reference destination information of the received moving picture preview, audio preview, still image preview and text preview, and the temporal and spatial layout information of these previews, the information relating to other corresponding meta data, validity period, version information, and the like (ST806). Then, preview meta data generating section 123 transmits the generated preview meta data to meta data server 102 via transmitting section 117 and communication network 106 (ST807).

On the other hand, meta data server 102 receives the preview meta data in receiving section 110 and transmits the preview meta data to meta data managing section 115. Meta data managing section 115 stores the transmitted preview meta data to preview meta data storing section 114.

Next, meta data server 102 shifts the processing to processing of transmitting meta data to receiving terminal 104 at a predetermined timing. First, meta data managing section 115 of meta data server 102 extracts the service description, purchase information, and preview meta data corresponding to the information that identifies the meta data transmitted in ST803 from service description storing section 112, purchase information storing section 113, and preview meta data storing section 114, respectively (ST808). Then, transmitting section 111 transmits the extracted meta data (service description, purchase information and preview meta data) to receiving terminal 104 via communication network 106 (ST809 to ST811).

On the other hand, receiving terminal 104 receives the service description, purchase information and preview meta data in receiving section 125, and transmits the information to meta data analyzing section 127 and preview generating section 131. Then, meta data analyzing section 127 analyzes the service description, purchase information, and preview meta data, extracts the information included in the service description, purchase information and preview meta data, and transmits the extracted information to EPG generating section 128 (ST812). Specifically, meta data analyzing section 127 extracts the content title, service details, and the like from the service description, and the charged fee, payment method, and the like from the purchase information.

On the other hand, EPG generating section 128 generates the EPG shown in FIG. 7 based on the information transmitted from meta data analyzing section 127 and transmits the displayed EPG to display section 129, and display section 129 displays the EPG (ST813).

Next, when the user who refers to the EPG selects preview data using input section 130 (ST814), preview generating section 132 analyzes the preview meta data corresponding to the selected preview data (ST815). Then, preview generating section 132 extracts the moving picture preview, audio preview, still image preview, text preview, and the like required for generating the preview data, and transmits the distribution requests thereof to preview-constituting data server 103 via transmitting section 126 and communication network 106 (ST816). When preview-constituting data server 103 unilaterally transmits the moving picture preview, audio preview, still image preview and text preview to receiving terminal 104 by a broadcast network or the like, preview generating section 132 extracts the moving picture preview, audio preview, still image preview, text preview, and the like required for generating the preview data from the received preview information. Preview generating section 132 acquires the preview data according to the extraction result from the data accumulated in receiving terminal 104 that is received in advance.

For example, in the case of preview meta data 500 shown in FIG. 5, preview generating section 132 transmits the sub-element "URI" 510 of the element "Video" to preview-constituting data server 103. Further, when receiving terminal 104 is determined not to have the capacity to display moving picture, preview generating section 132 transmits the sub-element "pictureURI" of the element "AlternativePicture" to preview-constituting data server 103 to request the alternative still image of the moving picture. Furthermore, when receiving terminal 104 is determined not to have the capacity to display still image, preview generating section 132 extracts the element "AlternativeText" 512, which is the alternative text of the moving picture.

On the other hand, preview managing section 124 of preview-constituting data server 103 receives the request for distributing the moving picture preview, audio preview, still image preview, text preview, and the like (specifically, reference destination information) transmitted from receiving terminal 104 via receiving section 116. Next, preview managing section 124 analyzes the reference destination information of the moving picture preview, audio preview, still image preview and text preview described in the distribution requests, and extracts the corresponding data from moving picture preview storing section 119, audio preview storing section 120, still image preview storing section 121, and text preview storing section 122, respectively. Then, preview managing section 124 transmits the extracted moving picture preview, audio preview, still image preview, text preview, and the like to receiving terminal 104 via transmitting section 117 and communication network 106 (ST817).

On the other hand, preview-constituting data acquiring section 131 of receiving terminal 104 acquires the moving picture preview, audio preview, still image preview, text preview, and the like from preview-constituting data server 103 via receiving section 125. Next, preview generating section 132 generates the preview data by arranging the moving picture preview, audio preview, still image preview, text preview, and the like acquired from preview-constituting data acquiring section 131, based on the layout information of the preview meta data (ST818). Then, preview generating section 132 transmits the generated preview data to display section 129, and display section 129 displays the preview data (ST819).

Display section 129 may display the preview data using the alternative still image or alternative text when the reception state of the preview data is poor. For example, when the preview data is transmitted by broadcasting and the moving picture preview to be displayed cannot be received, receiving terminal 104 may extract and display the received alternative still image or alternative text as the preview data. Further, when a request for distributing the moving picture preview is transmitted to preview-constituting data server 103 and preview data distribution does not start or end within a predetermined period of time, receiving terminal 104 may transmit the alternative still image or alternative text of the moving picture preview to preview-constituting data server 103 and the received alternative still image or alternative text may be displayed as the preview data.

Next, when the user who refers to the preview data inputs the selection of distribution of the content corresponding to the referred preview data from input section 130 (ST820), content processing section 133 converts the content transmitted from content server 101 to a form which can be displayed by display section 129, and transmits the converted content to display section 129. Then, display section 129 plays back and displays the content (ST821).

As described above, according to this embodiment, receiving terminal 104 can actively generate preview data from preview meta data. That is, in the preview meta data, the reference destination information of the data constituting the preview data is described instead of the entity of the preview data, so that, when the preview data is changed, it is possible to readily change the data constituting the preview data by changing the reference destination information, and realize flexible preview distribution. Further, when the preview is changed, the reference destination information or the data stored in the reference destination information is changed. However, it is only necessary for receiving terminal 104 to download only the changed reference destination information or data, so that, compared to the conventional method of redistributing the entire changed preview, it is possible to reduce communication fees and improve communication efficiency.

Further, in the preview meta data of this embodiment, the reference destination information of the plurality of data (moving picture, audio, still image and text) constituting the preview data and the layout information of the plurality of data (moving picture, audio, still image and text) may be described. Thus, a plurality of different data (moving picture, audio, still image and text) is combined, and rich picture data can be generated. That is, from the preview meta data it is possible to generate preview data from which an outline of the complicated content of recent years can be determined.

Furthermore, it is also possible to include the entity of the preview-constituting data such as moving picture in a part of the preview meta data. In this case, the entity of the preview-constituting data included in the preview meta data preferably has a small amount of data.

Further, according to this embodiment, receiving terminal 104 may use preview-constituting data such as the moving picture preview, audio preview, still image preview, text preview, and the like for generating the preview data stored in preview-constituting data server 103 as necessary. As a result, receiving terminal 104 may acquire these preview-constituting data stored in preview-constituting data server 103 only when necessary, and therefore it is not necessary to provide a large storage apparatus, and it is possible to realize a small storage apparatus. Further, the preview-constituting data including the moving picture preview, audio preview, still image preview, text preview, and the like is stored in preview-constituting data server 103, so that these preview-constituting data stored in preview-constituting data server 103 can be shared by a plurality of receiving terminals 104. As a result, it is possible to realize small storage apparatuses of the overall content distribution system 100.

Further, according to this embodiment, the reference destination information for the entity (moving picture preview, audio preview, still image preview, text preview, and the like) of the preview-constituting data is described in the preview meta data, so that, when the preview data is to be updated, the preview data can be updated by replacing only the entity of the preview-constituting data stored in preview-constituting data server 103. That is, receiving terminal 104 can reduce the processing relating to preview updating and can acquire new preview data.

Furthermore, content server 101, meta data server 102, and preview-constituting data server 103 have been described as separate configurations in this embodiment, but a single configuration is also possible.

Further, the processing performed by content server 101, meta data server 102, preview-constituting data server 103 and receiving terminal 104 may be programmed and executed on a general-purpose computer.

The present application is based on Japanese Patent Application No. 2005-058116 filed on Mar. 2, 2005, the entire content of which is expressly incorporated by reference herein.

Industrial Applicability

The preview distribution technique of the present invention has the advantage of realizing flexible preview distribution between the distributing side and user side, and is useful as a distributing apparatus, receiving apparatus and distribution system that distributes to a user terminal a preview of multimedia content such as moving picture, audio, still image, text, and the like, and a distribution method, reception method, and transmission/reception method thereof. Further, the present invention can reduce the data relating to the preview, accumulated in advance, so that it is possible to provide a large advantage by applying the present invention to an apparatus having a relatively small storage capacity such as a mobile terminal.

The invention claimed is:

1. A distributing apparatus, comprising:
a preview meta data manager that manages preview meta data for distribution to a plurality of receiving apparatuses, wherein the preview meta data includes reference destination information of an element constituting preview data of multimedia content, the preview data comprises a preview of the multimedia content, the preview of the multimedia content is generated from a plurality of multimedia data elements stored on a preview-constituting data server separate from the distributing apparatus, the plurality of multimedia data elements are configured to be displayed in a same time domain, the reference destination information comprises different reference destination information for each of the plurality of multimedia data elements, and the preview meta data including the reference destination information is broadcast to the plurality of receiving apparatuses for acquiring selected multimedia data elements of the plurality of multimedia data elements from the preview-constituting data server to generate the preview data; and
a transmitter that broadcasts the preview meta data to the plurality of receiving apparatuses,
wherein an alternative multimedia data element is acquired for one of the selected multimedia data elements when preview data distribution from the preview-constituting data server does not one of start and end within a predetermined period of time.

2. The distributing apparatus according to claim 1,
wherein the preview meta data further includes alternative data comprising at least one of an entity of still image, reference destination information of the still image, an entity of text, and reference destination information of the text.

3. The distributing apparatus according to claim 1,
wherein the reference destination information includes a service description that describes details of one of the content and purchase information for purchasing the content.

4. The distributing apparatus according to claim 1, wherein the preview meta data is referable from a service description that describes details of one of the content and purchase information for purchasing the content.

5. The distributing apparatus according to claim 1, wherein the reference destination information includes a channel dedicated to broadcasting the preview data.

6. The distributing apparatus according to claim 1, wherein the preview meta data describes the reference destination information and layout information indicating positional and temporal layout of the element, and the preview is generated based on the reference destination information and the layout information described in the preview meta data.

7. The distributing apparatus according to claim 1, wherein the reference destination information comprises reference destination addresses relating to storage destinations of the plurality of multimedia data elements stored on the preview-constituting data server.

8. The distributing apparatus according to claim 7, wherein the reference destination addresses are Uniform Resource Locators relating to the storage destinations of the plurality of multimedia data elements.

9. The distributing apparatus according to claim 1, wherein the alternative multimedia data element is acquired for the one of the selected multimedia data elements when it is determined that a corresponding one of the plurality of receiving apparatus does not have the capacity to display the one of the selected multimedia data elements.

10. A receiving apparatus, comprising:
a receiver that receives, through broadcast, preview meta data including reference destination information of an element constituting preview data of multimedia content, the preview data comprising a preview of the multimedia content, wherein
the preview of the multimedia content is generated from a plurality of multimedia data elements stored on a preview-constituting data server separate from a distributing apparatus, the plurality of multimedia data elements are configured to be displayed in a same time domain, the reference destination information comprises different reference destination information for each of the plurality of multimedia data elements, and the preview meta data including the reference destination information is broadcast to a plurality of receiving apparatuses for acquiring selected multimedia data elements of the plurality of multimedia data elements from the preview-constituting data server to generate the preview data;
a preview data element acquirer that acquires at least one of the plurality of multimedia data elements of the preview data, using the different reference destination information of each of the plurality of multimedia data elements included in the preview meta data; and
a preview generator that generates the preview data based on the plurality of multimedia data elements of the preview data,
wherein the preview generator generates the preview data using an alternative multimedia data element for one of the plurality of multimedia data elements when preview data distribution from the preview-constituting data server does not one of start and end within a predetermined period of time.

11. The receiving apparatus according to claim 10, wherein the preview meta data further includes alternative data comprising at least one of an entity of still image, reference destination information of the still image, an entity of text, and reference destination information of the text.

12. The receiving apparatus according to claim 10, wherein the reference destination information includes a service description that describes details of one of the content and purchase information for purchasing the content.

13. The receiving apparatus according to claim 10, wherein the preview meta data is referable from a service description that describes details of one of the content and purchase information for purchasing the content.

14. The receiving apparatus according to claim 10, wherein the reference destination information includes a channel dedicated to broadcasting the preview data.

15. A distribution system comprising a distributing apparatus and a plurality of receiving apparatuses, wherein:
the distributing apparatus comprises:
a preview meta data manager that manages preview meta data for distribution to the plurality of receiving apparatuses, wherein the preview meta data includes reference destination information of an element constituting preview data of multimedia content, the preview data comprises a preview of the multimedia content stored on a preview-constituting data server separate from the distributing apparatus, the preview of the multimedia content is generated from a plurality of elements, the plurality of multimedia data elements are configured to be displayed in a same time domain, the reference destination information comprises different reference destination information for each of the plurality of multimedia data elements, and the preview meta data including the reference destination information is broadcast to the plurality of receiving apparatuses for acquiring selected multimedia data elements of the plurality of multimedia data elements from the preview-constituting data server to generate the preview data; and
a transmitter that broadcasts the preview meta data to the plurality of receiving apparatuses; and
each of the plurality of receiving apparatuses comprises:
a receiver that receives, through broadcast, the preview meta data broadcast from the distributing apparatus;
a preview data element acquirer that acquires at least one of the plurality of multimedia data elements of the preview data, using the different reference destination information of each of the plurality of multimedia data elements included in the preview meta data; and
a preview generator that generates the preview data based on the plurality of elements of the preview data,
wherein the preview generator generates the preview data using an alternative multimedia data element for one of the plurality of multimedia data elements when preview data distribution from the preview-constituting data server does not one of start and end within a predetermined period of time.

16. A distribution method for broadcasting content preview data to a plurality of receiving apparatuses, the method comprising:
broadcasting preview meta data including reference destination information of an element constituting preview data of multimedia content to the plurality of receiving apparatuses, wherein the preview data comprises a preview of the multimedia content, the preview of the multimedia content is generated from a plurality of multimedia data elements stored on a preview-constituting data server separate from the distributing apparatus, the plurality of multimedia data elements are configured to be displayed in a same time domain, the reference destination information comprises different reference destination information for each of the plurality of multimedia data elements, and the preview meta data including the reference destination information is broadcast to the plurality of receiving apparatuses for acquiring selected multimedia data elements of the plurality of multimedia data elements from the preview-constituting data server to generate the preview data, wherein an alternative multimedia data element is acquired for one of the selected multimedia data elements when preview data distribution from the preview-constituting server does not one of start and end within a predetermined period of time.

17. The distribution method according to claim 16, wherein the preview meta data further includes alternative data comprising at least one of an entity of still image, reference destination information of the still image, an entity of text, and reference destination information of the text.

18. The distribution method according to claim 16, wherein the reference destination information includes a service description that describes details of one of the content and purchase information for purchasing the content.

19. The distribution method according to claim 16, wherein the preview meta data is referable from a service description that describes details of one of the content and purchase information for purchasing the content.

20. The distribution method according to claim 16, wherein the reference destination information includes a channel dedicated to broadcasting the preview data.

21. A reception method, comprising:

receiving, through broadcast, preview meta data including reference destination information of an element constituting preview data of multimedia content, the preview data comprising a preview of the multimedia content, wherein the preview of the multimedia content is generated from a plurality of multimedia data elements stored on a preview-constituting data server separate from a distributing apparatus, the plurality of multimedia data elements are configured to be displayed in a same time domain, the reference destination information comprises different reference destination information for each of the plurality of multimedia data elements, and the preview meta data including the reference destination information is broadcast to a plurality of receiving apparatuses for acquiring selected multimedia data elements of the plurality of multimedia data elements from the preview-constituting data server to generate the preview data;

acquiring at least one of the plurality of multimedia data elements of the preview data, using the different reference destination information of each of the plurality of multimedia data elements included in the preview meta data; and generating the preview data based on the plurality of multimedia data elements of the preview data, wherein the preview data is generated using an alternative multimedia data element for one of the plurality of multimedia data elements when preview data distribution from the preview-constituting data server does not one of start and end within a predetermined period of time.

22. The reception method according to claim 21, wherein the preview meta data further includes alternative data comprising at least one of an entity of still image, reference destination information of the still image, an entity of text, and reference destination information of the text.

23. The reception method according to claim 21, wherein the reference destination information includes a service description that describes details of one of the content and purchase information for purchasing the content.

24. The reception method according to claim 21, wherein the preview meta data is referable from a service description that describes details of one of the content and purchase information for purchasing the content.

25. The reception method according to claim 20, wherein the reference destination information includes a channel dedicated to broadcasting the preview data.

26. A transmission and reception method for broadcasting content preview data to a plurality of receiving apparatuses, the method comprising:

at a distributing apparatus, broadcasting preview meta data including reference destination information of an element constituting preview data of multimedia content to the plurality of receiving apparatuses, wherein the preview data comprises a preview of the multimedia content, the preview of the multimedia content is generated from a plurality of multimedia data elements stored on a preview-constituting data server separate from the distributing apparatus, the plurality of multimedia data elements are configured to be displayed in a same time domain, the reference destination information comprises different reference destination information for each of the plurality of multimedia data elements, and the preview meta data including the reference destination information is broadcast to the plurality of receiving apparatuses for acquiring selected multimedia data elements of the plurality of multimedia data elements from the preview-constituting data server to generate the preview data; and at each of the plurality of receiving apparatuses:

receiving, through broadcast, the preview meta data broadcast from the distributing apparatus;

acquiring at least one of the plurality of multimedia data elements of the preview data, using the different reference destination information of each of the plurality of multimedia data elements included in the preview meta data; and generating the preview data based on the plurality of multimedia data elements of the preview data, wherein the preview data is generated using an alternative multimedia data element for one of the plurality of multimedia data elements when preview data distribution from the preview-constituting data server does not one of start and end within a predetermined period of time.

* * * * *